Dec. 16, 1924.
A. O. DEETER
COUPLING DEVICE
Filed March 17, 1924
1,519,442
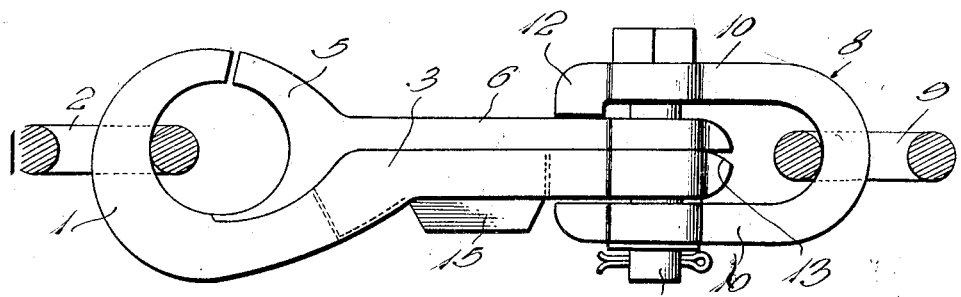
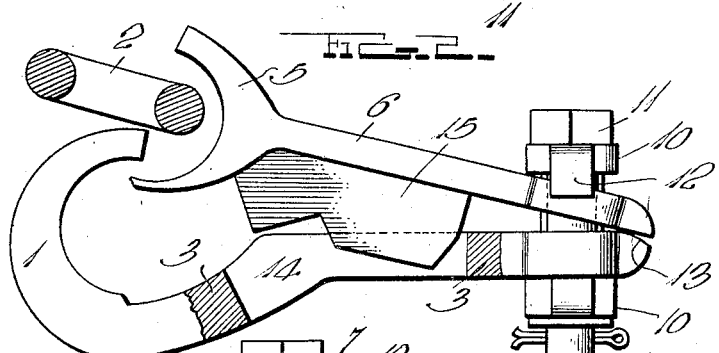
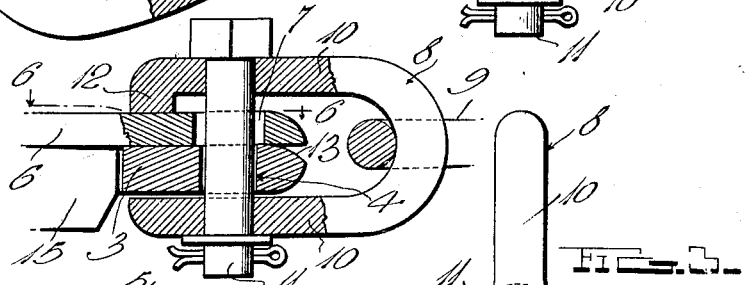
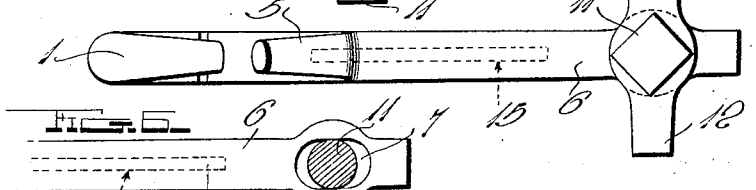
Witness
H. Woodard
Inventor
A. O. Deeter
By H. B. Willson & Co.
Attorneys Patented Dec. 16, 1924.

1,519,442

UNITED STATES PATENT OFFICE.

AMOS O. DEETER, OF MINOT, NORTH DAKOTA.

COUPLING DEVICE.

Application filed March 17, 1924. Serial No. 699,932.

*To all whom it may concern:*

Be it known that I, AMOS O. DEETER, a citizen of the United States, residing at Minot, in the county of Ward and State of North Dakota, have invented certain new and useful Improvements in Coupling Devices; and I do declare the following to be a full, clear, and exact description of the invention, such as will enable others skilled in the art to which it appertains to make and use the same.

My invention relates to improvements in couplings, such as those used for connecting chains, cables or other elements, and it is the object of such invention to provide an extremely simple and inexpensive device of this class including a hook, a guard for said hook, and novel means for holding said guard against accidental release, when the coupling device is under strain, provision being made however, whereby said guard may be easily moved to an inoperative position when the coupling is slack, so that it may be quickly and easily engaged with or disengaged from a chain or the like.

With the foregoing in view, the invention resides in the novel subject matter hereinafter described and claimed, the description being supplemented by the accompanying drawing.

Figure 1 is a side elevation of a coupling device constructed in accordance with my invention, showing it in operative condition.

Figure 2 is an elevation partly in section, illustrating the manner in which the guard may be moved out of operative position.

Figure 3 is a plan view with the several parts related as shown in Fig. 2.

Figure 4 is a similar view with the parts in the relation shown in Fig. 1.

Figure 5 is a vertical sectional view on line 5—5 of Fig. 4.

Figure 6 is a horizontal section on line 6—6 of Fig. 5.

In the drawing above briefly described, the numeral 1 designates a hook adapted for engagement with a chain link or the like 2, said hook being provided with a shank 3 whose free end is formed with an opening 4. A guard 5 co-acts normally with the hook 1 to prevent removal of the link or the like 2 therefrom, and this guard is provided with a carrying shank 6 which extends longitudinally of the shank 3, the free end of said shank 6, being formed with an elongated opening 7 which is alined with the opening 4. A U-shaped shackle 8 for passage through another link or the like 9, has its side arms 10 disposed to straddle the free ends of the shanks 3 and 6, rather loosely, and a bolt 11 passes through said arms 10 and through the openings 4 and 7. The free end of one of these arms 10, is provided with a nose 12 which engages one of the shanks, preferably the shank 6, as shown in Fig. 1. Thus, the two shanks are held against separation from each other when they are in alinement with the shackle 8, as illustrated in Figs. 1 and 4. When, however, the shackle and shanks are relatively angled, as depicted in Figs. 2 and 3, the nose 12 clears the shank 6 and the latter may be swung away from the shank 3, in a plane common to the axis of the bolt 11. This movement will release the guard 5 to permit attachment or detachment of the link 2.

In order to prevent excessive weakening of the free ends of the shanks 3 and 6, by forming the openings 4 and 7 therethrough, said ends preferably extend some distance beyond the openings and in order that these extended ends shall not interfere with release of the guard 5, one of them is preferably beveled as indicated at 13, the function of the bevel being fully shown in Fig. 2.

I preferably form a longitudinal slot or other opening 14 in one of the shanks 3—6 and provide the other shank with a longitudinal flange or other equivalent projection 15 which extends through and beyond said slot or opening. This construction holds the two shanks against independent pivotal movement about the bolt 11. Also, if the device should be covered with ice and hence hard to release, the projection 15 may be struck with a hammer or the like to separate the two shanks in the manner shown in Fig. 2.

Excellent results may be obtained from the details disclosed and they are therefore preferably followed, but within the scope of the invention as claimed, numerous minor changes may be made.

I claim:

1. A coupling comprising a hook shank having a hook at one end, a guard for said hook having a shank extending longitudinally of said hook shank, the free ends of the two shanks having alined openings whose axis is in the same plane as said hook a U-shaped shackle whose arms straddle said free ends of the shanks, one of said arms having a nose engaging one of said shanks and normally preventing separation of the two shanks, and a pivot bolt passing through said shackle arms and the aforesaid alined openings, the opening of said guard shank being sufficiently large to permit swinging of the latter in a plane common to the bolt axis when the two shanks and shackle are relatively angled to free said nose from engagement with said one shank.

2. A structure as specified in claim 1; one of said shanks having an additional opening spaced inwardly from the other openings, and a projection on the other shank in the same plane with the bolt-axis and hook, said projection extending through and beyond said additional opening, whereby to act as means for separating said shanks and to prevent independent pivotal movement of said shanks about said bolt.

In testimony whereof I have hereunto affixed my signature.

AMOS O. DEETER.